United States Patent [19]

Hendrix et al.

[11] 4,348,893
[45] Sep. 14, 1982

[54] RELATIVE COMPRESSION OF AN ASYMMETRIC INTERNAL COMBUSTION ENGINE

[75] Inventors: Tony D. Hendrix, Kokomo, Ind.; Rinaldo R. Tedeschi, Newington, Conn.

[73] Assignee: United Technologies Corporation, Hartford, Conn.

[21] Appl. No.: 93,656

[22] Filed: Nov. 13, 1979

[51] Int. Cl.³ ............................................. G01M 15/00
[52] U.S. Cl. ........................................ 73/116; 364/551
[58] Field of Search .................. 73/116, 115; 364/431, 364/551

[56] References Cited

U.S. PATENT DOCUMENTS 4,179,922  12/1979  Bouverie et al. ..................... 73/116

Primary Examiner—Jerry W. Myracle
Attorney, Agent, or Firm—Dominic J. Chiantera

[57] ABSTRACT

Relative compression in an asymmetric internal combustion (IC) engine is determined by measuring the change in speed of the engine crankshaft while the engine is cranked without ignition during each cylinder sub-cycle; the actual change in speed from a maximum to a minimum is measured during the compression stroke of each cylinder of the cylinder bank which is first to fire in the alternating left bank/right bank firing order of the engine, and the change in speed from a minimum to a maximum is measured during the expansion stroke of each cylinder of the second bank, such that the changes in engine speed over one engine cycle is provided as a sequence of delta speed signals associated alternately with a compression stroke and next with an expansion stroke for succeeding left bank and right bank cylinder displacements in accordance with the firing order; the delta speed signal magnitude associated with each cylinder, i.e. the compression stroke interval for the first bank of cylinders and the expansion stroke interval for the second bank of cylinders are ratio to the maximum delta value measured from among all cylinders to provide the relative compression ratio of each as a percentage of the maximum; alternately, the measured delta speed magnitude of each cylinder is ratio to the average of the delta signal values excluding the minimum delta value with each ratio limited to a unity, or 100% value.

7 Claims, 9 Drawing Figures

FIG. 2
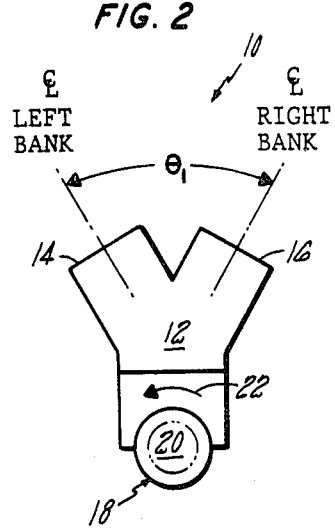
FIG. 3
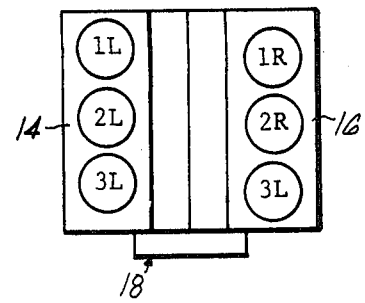
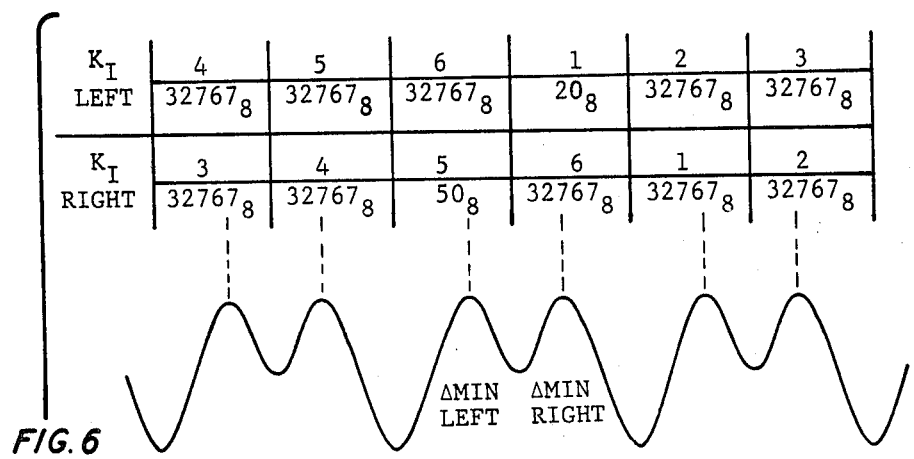
K_I IS USED IN COMPUTING THE
CORRECTION FACTOR FOR EACH CYLINDER.
THE $K_I$ IS CHOSEN BASED ON WHICH
BANK HAS THE MIN. SPEED DELTA.
K1 IS THE FIRST CYLINDER AFTER
THE MIN. DELTA CYLINDER. K5 IS THE
FIFTH. K6 IS THE $K_I$ FOR
THE MIN. DELTA CYLINDER.
FIG. 6

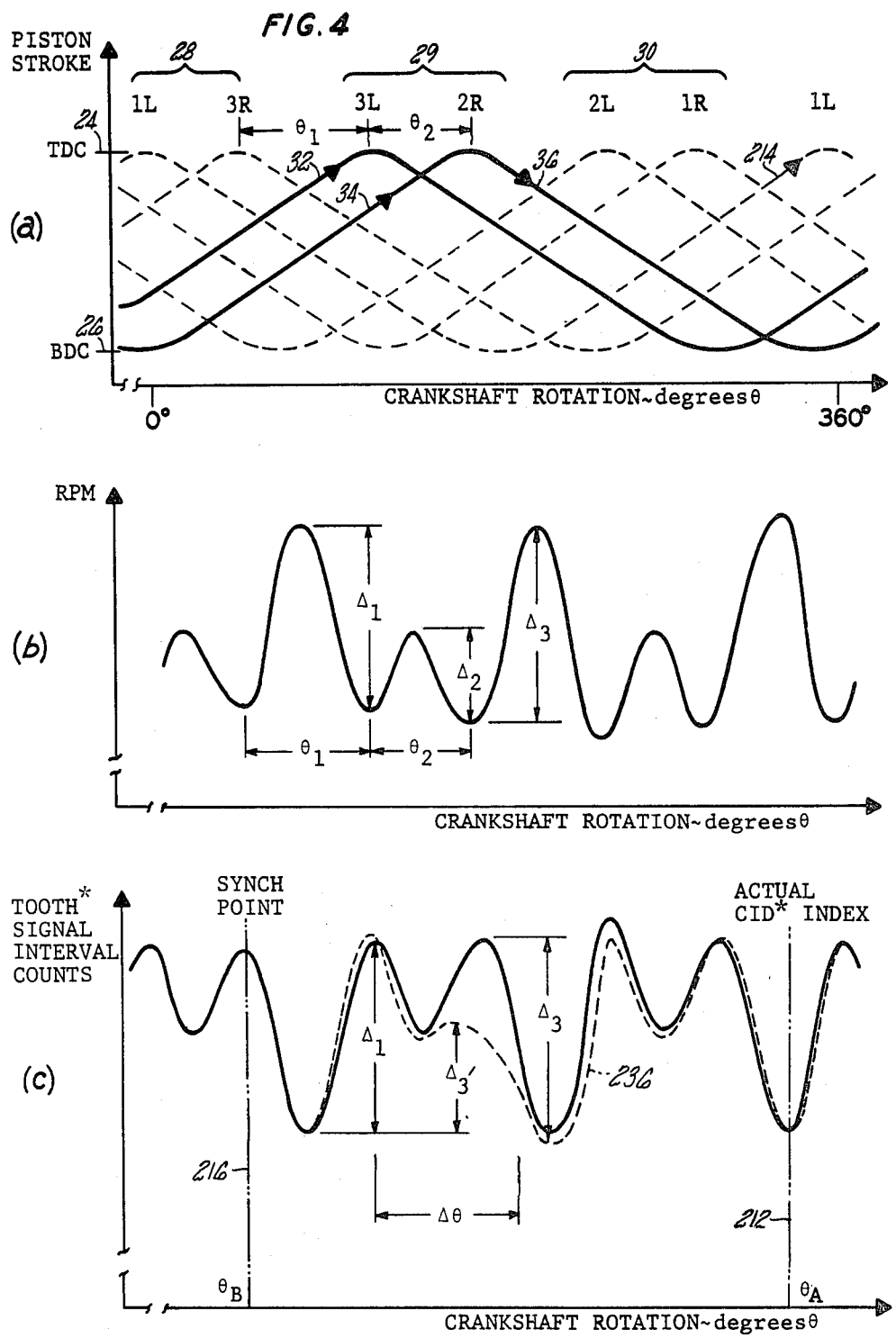

RELATIVE COMPRESSION OF AN ASYMMETRIC INTERNAL COMBUSTION ENGINE

TECHNICAL FIELD

This invention relates to electronic analysis of internal combustion engines, and more particularly to the electronic measurement of relative compression in an asymmetric internal combustion (IC) engine.

BACKGROUND ART

As known in the art of combustion engine diagnostics, the torque on the crankshaft of an IC engine increases and decreases as the gas, or volume is in the cylinder compresses and expands during cranking of the engine. Early methods of analyzing the compression of each cylinder of an engine included analysis of the engine starter current magnitude during cranking since the required torque, and therefore starter current, increases on each compression stroke of the cylinder's piston. By comparison of the relative magnitudes of change in starter current associated with the compression stroke of each cylinder, the relative compression among all the cylinders of the engine could then be determined. One such apparatus for measuring the relative compression in an IC engine is disclosed in U.S. Pat. No. 4,050,296 of common assignee herewith, to R. S. Benedict where the relative compression is measured electronically by measuring excursions in a selected engine parameter which varies as a consequence of the compression stroke of each cylinder. In the system of Benedict the engine parameter measured may be starter current, starter voltage, or instantaneous sub-cyclic engine speed, all of which are measured as a function of time through the engine firing cycle through the use of a cylinder identification (CID) signal indicating a particular point, such as a particular cylinder piston position or the opening or closing of an exhaust valve, all of which occurs once within an engine revolution. This indexing of the measured parameter to a crankshaft event allows identification of each cylinder since the firing order and therefore the cyclic displacement of each cylinder piston from the crankshaft index is known.

In asymmetric IC engines where the crankshaft angle displacement between top dead center (TDC) of the engine cylinders is asymmetrical, i.e. the crankshaft angular value between TDC of a common bank of cylinders (left or right bank) is on even degrees submultiple of one revolution (360° divided by the number of cylinders in the bank) whereas the crankshaft angle value between TDC of adjacent firing cylinders as defined by the engine firing order are asymmetrical as determined by the mechanical angular displacement of the two cylinder banks, or the inter-bank angle. As a consequence the crankshaft angle interval between TDC of adjacent firing cylinders is unequal. In the symmetrical firing IC engine the measurement of the engine parameter (starter current, etc.) as disclosed by Benedict is measured for equal increments on each cylinder (equal compression stroke increments), such that the relative contribution parameter is readily determined. In the asymmetric engine, however, the variation in compression stroke intervals due to the asymmetric spacing of adjacent cylinder TDC results in unequal excursions of the selected engine parameter for the adjacent cylinders. This is due to the fact that the most closely spaced cylinders overlap on their compression strokes such as to mask the change in selected parameter for the second one of the two cylinders in the firing order. This prohibits obtaining a relative compression value indication when half of the cylinders contribute a substantially smaller change in the selected parameter than the remaining half. While it is true that the relative compression values may be given for each bank which itself may provide some useful indicator of overall compression, this does not provide the compression information required for the advance diagnostics.

DISCLOSURE OF INVENTION

One object of the present invention is to provide a common relative compression measurement indication for all cylinders on an asymmetric IC engine. Another object of the present invention is to provide for the improved determination of cylinder compression indicia which is useful in providing relative compression measurement in an asymmetric IC engine.

According to the present invention the indication of cylinder compression in asymmetric engines is the change in engine cranking speed coincident with the compression stroke of the first firing cylinder in each cylinder pair and the change in engine cranking speed coincident with the expansion stroke of the second cylinder in each pair. In further accord with the present invention each change in cranking speed is measured with respect to crankshaft angle position.

These and other objects, features, and advantages of the present invention will become more apparent in light of the detailed description of an embodiment thereof, as illustrated in the accompanying drawing.

BRIEF DESCRIPTION OF DRAWING(S)

FIG. 2 is a simplified illustration of an end view of an IC engine in which the present invention may be used;

FIG. 3 is a top view of the engine in FIG. 2;

FIG. 4 is an illustration of various waveforms used in the description of the embodiment of FIG. 1;

FIG. 6 is a tabulation of typical compression correction values as may be used in the present invention.

BEST MODE FOR CARRYING OUT THE INVENTION

Figure 1:
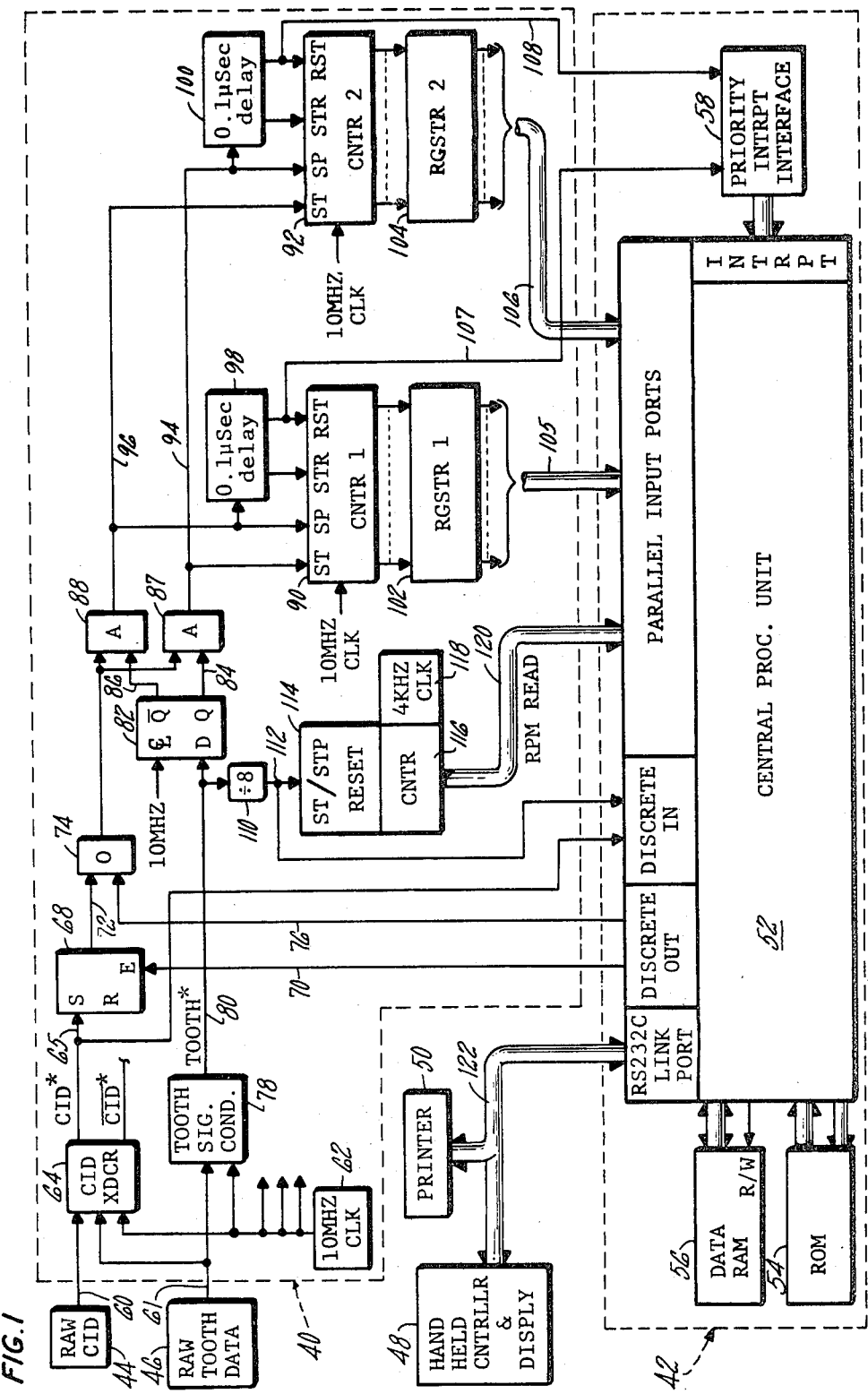
FIG. 1 is a system block diagram illustration of one embodiment for measuring relative compression of an asymmetric IC engine according to the present invention.

Referring first to FIG. 2, in a simplified end view of an asymmetric IC engine 10 the cylinders are disposed in a V configuration block 12 including a left bank of cylinders 14 and a right bank of cylinders 16 as referenced from the engine flywheel 18. The flywheel is connected to the engine crankshaft and includes a ring-gear 20, shown in phantom. In the detailed description the engine is a six cylinder, two cycle (two stroke) type with right-hand rotation, such as the Detroit Diesel Allison (DDA) model 6 V-53 with crankshaft rotation in the counterclockwise direction as shown by arrow 22. The V displacement of the cylinders results in an interbank angle ($\theta_1$) between the center lines of the left and right cylinder banks, which in the DDA 6 V-53 is 66.7°.

Referring to FIG. 3, in a top view of the engine 10 of FIG. 2 the cylinders are designated 1, 2, and 3 left (L) and right (R) in consecutive order from the front of the engine to the flywheel. The two cycle engine includes a two stroke cylinder cycle, i.e. a compression stroke and a power stroke, occurring on each revolution (360°) of the crankshaft, such that one revolution of the crankshaft equals one engine cycle. In the V-6 engine the top dead center (TDC) piston position of the cylinders in each bank occur at equal crankshaft angular intervals of 120 degrees, however, the cylinder firing order alternates from right bank to left bank cylinders with crankshaft angular spacing of TDC between successive firing right bank and left bank cylinders being defined by the interbank angle $\theta_1$. In an asymmetric engine the interbank angle is not a cylinder sub-multiple of 360 degrees, i.e. the DDA 6 V-53 engine with an interbank angle of 66.7 degrees, which results in the asymmetry of TDC spacing along the crankshaft. In FIG. 4, illustration (a), the piston displacement for the six cylinders between TDC 24 and BDC 26 is illustrated for the right hand rotation firing order. The crankshaft angle spacing between TDC of a right bank cylinder (such as 3R) and TDC of the next firing left bank cylinder (3L) is equal to the interbank angle ($\theta_1=66.7°$) while that between TDC of the left bank cylinders (3L) and the next firing right bank cylinder (2R) is $\theta_2=120°-\theta_1$, or 53.3° for the 6V-53 engine. The adjacent firing cylinders having their TDC displaced by $\theta_2$ comprise a cylinder pair, as illustrated by the three cylinder pairs 28–30, and the angle $\theta_2$ is the cylinder pair angle.

The change in torque of the crankshaft as the gas in each cylinder compresses and expands during the cylinder cycle is illustrated in FIG. 4 illustration (b) as a change in engine cranking speed plotted against crankshaft angular position. As illustrated the change in speed for successive cylinder cycles is non-symmetrical. The greatest magnitude speed change occurs between cylinder pairs and the smaller change in speed occurs between TDC of the cylinders in each pair. The change in speed with compression in each cylinder results, as for the cylinder pair 29, in a decrease in speed ($\Delta_1$) coincident with the compression stroke 32 of the first cylinder 3L of the pair, while the compression stroke 34 of the second cylinder 2R results in a speed decrease $\Delta_2$, which is approximately one third the magnitude of $\Delta_1$. The unequal speed change $\Delta$ values for the compression strokes of the cylinders of each pair makes it impossible to use the relative compression test performed on symmetrical firing engines, namely measurement of the magnitude fluctuations in cranking speed coincident with the compression stroke of each cylinder.

In the present invention the measurement of relative compression in an asymmetric IC engine is performed by measuring the change in cranking speed coincident with alternate strokes of the adjacent cylinders in each cylinder pair, i.e. the speed $\Delta$ associated with the compression stroke for the first one of the cylinders in each cylinder pair and by measurement of the speed $\Delta$ associated with the expansion stroke of the second cylinder of each pair. As used herein the term expansion stroke defines the piston power stroke, or displacement between TDC and BDC, during engine cranking without ignition. In the absence of ignition the gas (air) within the cylinder is assumed to be ideally compressible, such that the displacement of the piston during cranking is assumed to be an adiabatic process. In other words the change in volume of the gas in the cylinder during piston travel from TDC to BDC (the expansion stroke) is equal and opposite to the volume change of the gas during piston displacement from BDC to TDC (compression stroke). This is evidenced in illustration (b) by the cranking speed increase ($\Delta_3$) associated with the expansion stroke 36 of cylinder 2R. The speed change $\Delta_3$ is substantially equal to that of $\Delta_1$, and in an ideal system where each cylinder of the pair has equal compression the respective decrease and increase speed $\Delta$'s measured for the cylinder pair would be equal.

Referring now to FIG. 1, in a best mode embodiment for carrying out the invention apparatus for measuring electronically the relative compression of an asymmetric IC engine includes: data acquisition unit 40, a digital signal processor 42, a proximity sensor 44 such as Electro Corporation Model 4947 Proximity Switch for measuring engine cylinder identification (CID), a proximity sensor 46 such as Electro Corporation RGT Model 3010-AN Magnetic Proximity Sensor for sensing the passage of the engine flywheel teeth, and a hand held controller 48 similar to that described in U.S. Pat. No. 4,113,980 of common assignee herewith, issued to M. Bell. The apparatus may also include a line printer 50. The signal processor 42 includes: a central processing unit (CPU) 52 (such as the 16 bit Intel 8086), a read only memory ROM 54, a random access memory (RAM) 56, and priority interrupt interface 58, all of which is described in detailed operation hereinafter.

The proximity sensor 44 which provides raw engine CID data and the sensor 46 providing raw engine tooth data (the passage past a reference point of the teeth on the ring-gear 20 of the engine flywheel 18, FIG. 2) are installed on the engine in the same manner described in the hereinbefore referenced patent to Benedict, and each provide the raw data on lines 60, 61 to the data acquisition unit 40. The raw CID data, the raw tooth data, and the signal from a high frequency clock 62 (typically 10 Mhz) are presented to a CID transducer 64, such as that described in U.S. Pat. No. 4,043,189 of common assignee herewith, to R. Tedeschi, which provides a signal conditioned CID (CID*) and a $\overline{CID}$* on lines 65, 66 to a gate enabled latch 68. The latch, in the presence of a gate enable signal from the signal processor on a line 70 to the Enable input thereof, provides a latched logic one signal on an output line 72 on the rising edge of the first CID* pulse appearing after enable, and resets to zero with removal of the enable gate. The output of the latch is presented to one input of an OR gate 74, which receives at a second input a second processor gate signal on the line 76, as described hereinafter.

The raw tooth signal data is a series pulse stream. Each pulse represents the passage of a ring-gear (20, FIG. 2) tooth past a reference point as the engine crankshaft rotates. The total number of teeth ($T_c$) on the ring-gear varies with engine type and the angle interval between teeth is equal to $360°/T_c$. The raw tooth signals are conditioned by signal conditioning circuitry 78, similar to that of the CID transducer 64, which provides conditioned tooth (TOOTH*) signals on a line 80 to a divide-by-two frequency divider 82, such as a D edge triggered flip-flop, which provides Q (line 84) and $\overline{Q}$ (line 86) output signals on one half the TOOTH* signal frequency to an associated one of the AND gates 87, 88. The AND gates also receive the output from the OR gate 74 and, in combination, provide the enable/disable control of 16 bit binary counters 90, 92. This is provided by presenting the output of AND gate 87 through a line 94 to the start (ST) input of counter 90 and the stop (SP) input of counter 92, and presenting the output of AND gate 88 through a line 96 to the SP input of counter 90 and the ST input of counter 92. In operation the alternating Q, $\overline{Q}$ signals are ANDED with the output from the OR gate 74, to provide alternate enabling of the counters 90, 92 on alternate TOOTH* signal intervals. The counters 90, 92 count the number of 10 Mhz clock signals appearing within the corresponding TOOTH* signal interval, each enabled or disabled alternately on the rising edge of each successive TOOTH* signal. The output from each counter represents a manifestation of the time period of the tooth interval, i.e. the number of known frequency clock pulses within each interval, which can be used with the known angle between teeth to determine instantaneous, or sub-cyclic RPM of the engine.

The stop (SP) signal to each counter from the gates 87, 88 are also presented to an associated one-shot monostable 98, 100 which after the delay period (typically one clock period, or 0.1μ Sec) provide a strobe (STR) to the associated counter which transfers the count data into the associated one of two buffer registers 102, 104, the outputs of which are connected through lines 105, 106 to the processor. Following the strobe each delay provides a counter reset of the associated counter which is also provided as a discrete "DATA READY COUNTER 90 (92)" signal on lines 107, 108 respectively to the priority interrupt interface 58 of the processor. The DATA READY discretes may alternately be provided as discrete input signals directly to the CPU 52 if desired by providing for the CPU read of these discretes. The use of the priority interrupt simply allows for the time variations between data readouts as required by variations in engine cranking speed, which in turn may arise from the variations in engine conditions, i.e. weak battery. The count data strobed into each register 102,104 is written over the previously stored data, such that no reset of the registers is required.

Since the relative compression test depends on measurement of speed changes occurring during compression or expansion stroke of the engine cylinders the engine cranking speed must be above some minimum cranking speed data acquisition to allow accurate relative compression measurement. The data acquisition hardware provides an average RPM cranking speed indication by presenting the TOOTH* signals on lines 80 to the input of a divide-by-eight frequency divider 110 (typically includes four cascaded bistable devices) which provides the one eighth TOOTH* frequency signal on an output line 112 to the input of a decode 114. The decode provides start (ST), stop (STP) gates coincident with the rising and falling edges of the divide-by-eight output signal to a counter 116, which, when enabled, counts clock pulses from an associated low frequency clock 118 (typically 4 Khz) and provides on lines 120 the clock count corresponding to alternate eight TOOTH* signal intervals. This count provides a manifestation of the average cranking speed, i.e. a time count which is equal to 1/RPM. The divide-by-eight output on lines 112 is also presented to a discrete input of the CPU 52 which looks for the falling edge as an indication that the counter output is ready to be read. The counter 116 may be reset within one clock period preceding the start, such that the data remains on the line 120 for essentially a full eight tooth interval.

The CPU 52 provides the two discrete output enable signals on the line 70, 76 as described hereinbefore. The discrete provided on the line 70 is a DATA ACQUISITION ENABLE WITH CID and that provided on line 76 is a DATA ACQUISITION ENABLE WITHOUT CID. This second signal on line 76 is to accommodate the relative compression measurement in the absence of a CID transducer installed on the engine. As known the CID provides a crankshaft index which allows identification of each cylinder in the firing order. This permits readout of the relative compression of identified cylinders. The test may be performed without the index which results in relative compression information without cylinder identification, although from knowledge of the firing order, a particular compression value can be identified with a particular one of the cylinder banks. This then requires an alternate method of isolating the fault to a particular cylinder. Communication between the CPU and the hand held controller 48 is provided through lines 122 connected between the controller and an RS232C link port on the CPU. This is a two-way communication port permitting communication between the operator and the test apparatus whereby the operator can, through the controller keyboard, command the start of, or changes in, the data acquisition and relative compression measurement routines performed by the CPU. The line printer 50 is similarly connected to the RS232C port of the CPU through the lines 122.

Referring simultaneously to FIG. 1, 5A the relative compression measurement routine beings with operator entry into the controller keyboard of a START command in instruction 130 and model identification information for the engine under test in instructions 132. The CPU next executes instructions 134 setting of the CPU address counter to zero ($C_A=0$). Instructions 136 next request the CPU read of the specifications for the identified engine which are stored in the ROM 54, the instructions 138 determine the total number of address locations required in RAM (56) for data storage as the product of the specified number of ring-gear teeth multiplied by the number of engine cycles of data to be acquired (typically four). Instructions 140 request a read of the cranking RPM on the lines 120 following the presence of a discrete RPM read on the lines 112. Decision 142 asks whether or not cranking RPM is greater than a selected minimum cranking speed, and if not, than the test routine is held in a loop awaiting either an operator CLEAR of the test, or the minimum RPM value. This is provided by instructions 144 which display an error to the controller followed by instructions 146 asking whether or not an operator CLEAR has been made. If so, then the CPU waits for a new operator test entry in instructions 148. In the absence of an operator CLEAR instructions 150 again ask if measured RPM is greater than the minimum and if not, the CPU again cycles the loop by again displaying a keyboard error in instructions 144. The CPU processor will sit within this loop until either a CLEAR by the operator, or the pressure of a cranking speed above minimum. A delay in achieving min RPM occurs in relative compression measurements on diesel engines where there is a considerable delay for the engine to reach cranking speed.

If RPM is above minimum, in either instructions 142 or 150, the CPU next executes instructions 152 which determines if a CID is connected. Information as to whether or not a CID sensor is installed may be entered by the operator in instructions 132 together with the engine model type. If a CID sensor is installed instructions 154 determine if a CID signal is actually present by a read of discrete input line 65 to look for the presence of a CID* signal. Since the CID* appears only once per engine cycle, if not present due to an intracycle read or due to error, the CPU agains falls into a waiting loop (instructions 148) after first displaying an error in instructions 156 and determining whether or not an operator CLEAR has been made in instructions 158. If there is no CLEAR the CPU again looks for the presence of CID* signal in instructions 160. Following the presence of a CID* in either instructions 154 or 160 the CPU provides in instructions 162 a DATA ACQUISITION ENABLE gate signal through the line 70 to the latch 68, thereby enabling data acquisition by the hardware. In the absence of a CID sensor (NO to instructions 152) instructions 164 request the CPU provide a display to the operator indicating that the relative compression measurements are without CID, informing the operator that exact cylinder identification is not possible. Following this the CPU then provides in instructions 166 a DATA ACQUISITION ENABLE WITHOUT CID gate signal on the line 76 to the OR gate 74. Following instructions 162 or 166 the CPU is ready to receive data.

As stated before the clock count data acquired by the processor from the counters 90, 92 has the dimensions of time, or the reciprocal of engine speed, as shown in FIG. 4 illustration (c) which represents the waveform composite of the acquired by the data acquisition unit 40 in terms of clock count data provided in each tooth interval in response to actual engine cranking speed as shown by the speed waveform of illustration (b). As in illustration (b) only the change in data is illustrated in (c), i.e. the steady state component is not shown. As shown the data waveform is the reciprocal of the engine speed change waveform.

Figure 5A:
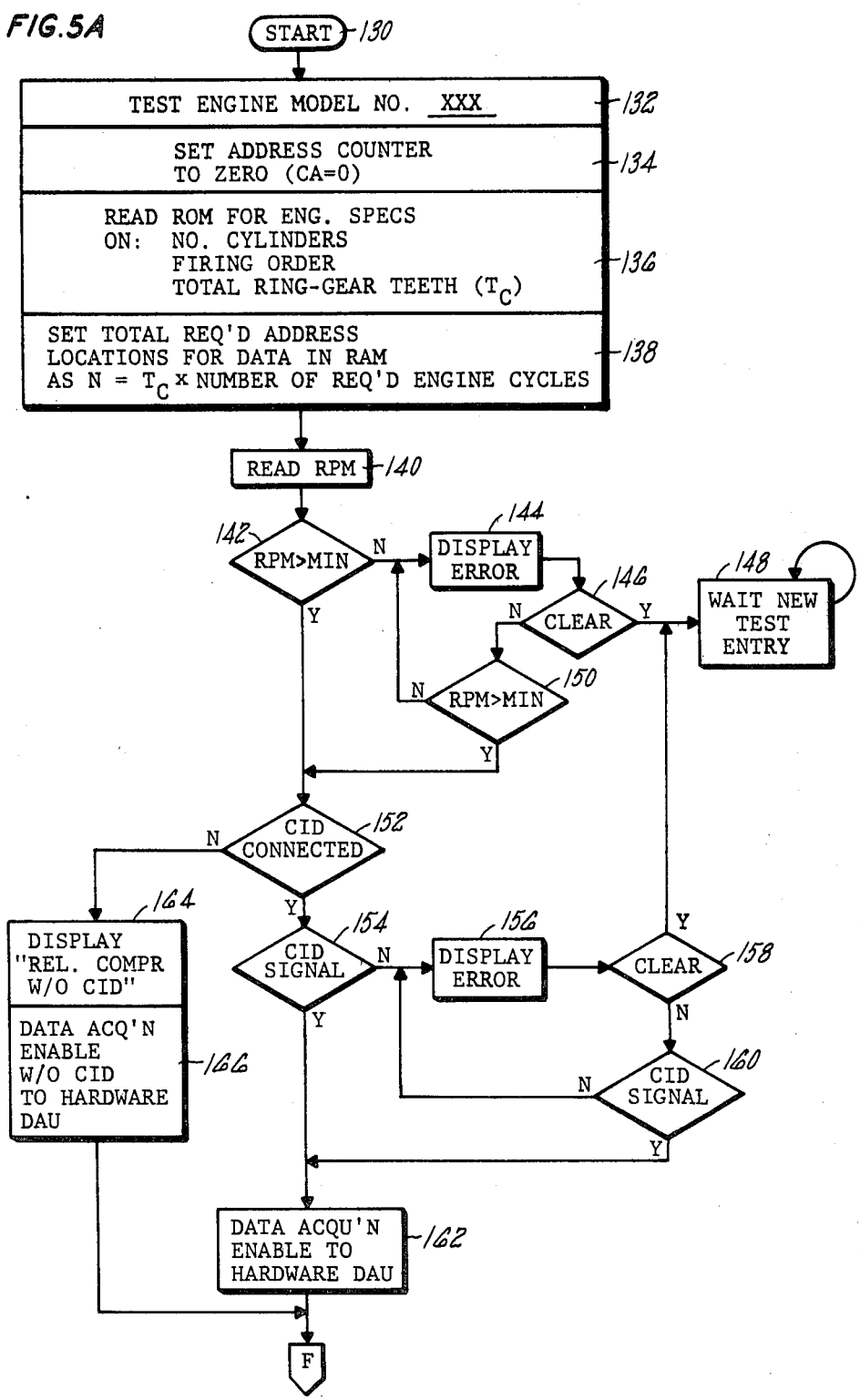
FIGS. 5A–5D is a logic flow chart diagram illustrating the steps of measuring relative compression in an asymmetric IC engine as may be used in the embodiment of FIG. 1.
Figure 5B:
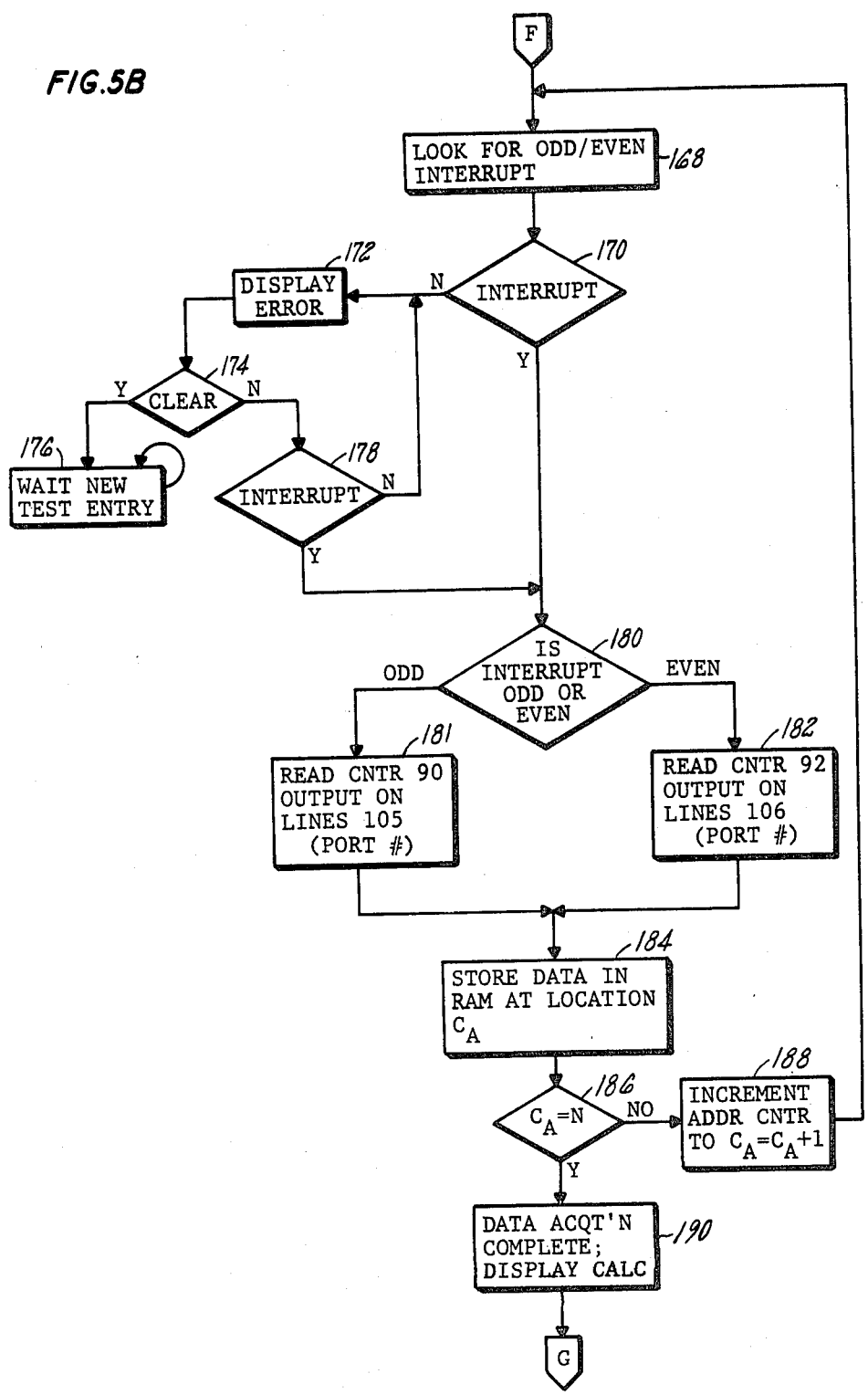

Referring now to FIG. 5B in the routine performed by the CPU in acquiring the count data from the data acquisition unit instructions 168 command the CPU to look for odd/even interrupts, i.e. the line 107 (odd) or the line 108 (even) discrete indicating DATA READY COUNTER 90 (92). Instructions 170 ask whether an interrupt has been received and if NO the CPU agains falls into a waiting loop similar to that described hereinbefore for the RPM and CID* signal determinations. Instructions 172 request display of a keyboard error followed by instructions 174 which ask if an operator CLEAR has been made, and if YES than instructions 176 command the CPU to wait for a new test entry. In the absence of CLEAR, instructions 178 again ask if an interrupt is present. If NO the keyboard error is again displayed. Following the presence of an interrupt in instructions 170 or 178, instructions 180 determine if the interrupt is odd (counter 90) or even (counter 92) decide which of the two data lines 105, 106 are to be read in instructions 181, 182. Instructions 184 define the data storage location in the RAM 56 beginning of the first tooth interval count of the first engine cycle as location $C_A$, after which instructions 186 determine if the location $C_A = N$, i.e. the total number of address locations for the total number of engine cycles of data to be stored indicating a complete data acquisition routine. If NO, instructions 188 increment the address counter by one after which the CPU returns to instructions 168 to look for the next succeeding interrupt. Following a YES answer to instructions 186 indicating that the full number of engine cycles of data have been received instructions 190 request a CPU discrete to the controller 48 to display an indication of the completion of data acquisition, such as CALC, thereby notifying the operator that engine cranking may be stopped.

Following the data acquisition, with all the data points stored in the RAM 56, the data may be processed at any time. The engine cycle data stored in the RAM for the number of cycles requested, assuming a typical four engine cycle acquisition, is conditioned by the signal processor 42 to provide a referenced set of cycle data from which the relative compression information may be obtained. The first step in conditioning is to obtain an average set of values for all of the cycles measured. Typically the data acquired varies from cycle to cycle due to variations in the cranking speed and in the overall repeatability of the engine performance from cycle-to-cycle. Averaging the acquired cycles produces a referenced set of values which eliminates the variations. The second conditioning step is to provide low pass software filtering of the individual data points within the averaged cycle data set. This is required due to variations in the spacing of the ring-gear teeth due to wear and also manufacturing tolerance which produce variations in tooth intervals and consequently variations in clock counts. This results in what appears to be a high frequency distortion on the data waveform which may be eliminated by M point low pass filtering in the software. Each data point is read out of RAM together with M number of data points preceding and following the present data point. The data points are summed together, divided by the total number of data points and the resultant data value is read back into RAM at the same location. This produces the averaged, low pass filter waveform of data points which appears substantially sinusoidal as shown in FIG. 4 (illustration (c)), from which the speed Δ values may be calculated.

Figure 5C:
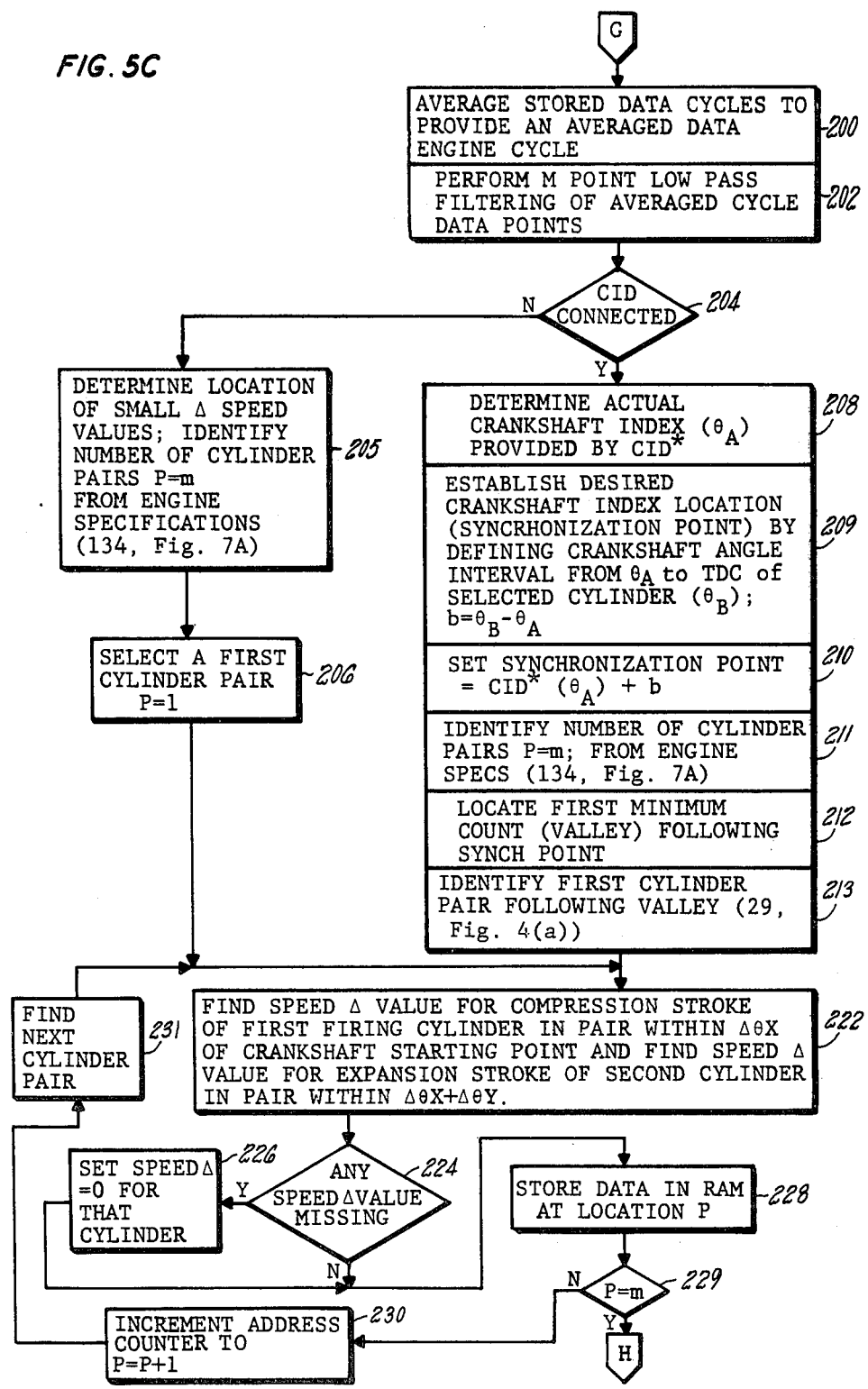

Referring now to FIG. 5C, the relative compression calculation routine performed by the CPU begins with instructions 200 which request the averaging of the stored data cycles to provide the averaged data waveform, and instructions 202 next request the M point low pass filtering of the data points of the averaged waveform. As evident from illustration (c) the cylinders in each cylinder pair may be readily identified as left or right if the engine firing order is known, however, the individual cylinders cannot be identified without a crankshaft angle index which establishes a reference point within the engine cycle from which the cylinders may be identified. Instructions 204 determine if an index is available by again asking if a CID sensor was installed in the test engine and if not then instructions 205 request the CPU to scan the reference data waveform to find the small speed Δ values (the small valley to peak changes in tooth count) which indicate the various cylinder paris (P=m) and instructions 206 request selection of a first (P=1) cylinder pair. If a CID sensor was installed instructions 208–210 determine the crankshaft index location. A crankshaft index used to identify the cylinders may be any point selected from the cylinder firing order and is derived from the actual crankshaft location manifested by the CID sensor which generally defines a piston position other than TDC since the CID proximity sensor (44, FIG. 1) is typically installed in the valve cover of the engine in close proximity to the cylinder rocker arm (either exhaust or intake valve). In FIG. 6 the phantom line 212 defines an assumed crank shaft position represented by the actual CID signal which detects the motion of the exhaust valve of cylider 1L somewhere within the compression stroke 214 of the cylinder. The crank shaft angle for the actual CID is $\theta_A$. The phantom line 216 defines a selected crank shaft index, or synchronization point, as TDC of cylinder 1L located at a crank shaft angle $\theta_B$. The angular difference $\theta_B - \theta_A$ is a constant b stored in the ROM 54 and added to the actual CID* pulse received by the processor on the line 65 to obtain the selected synchronization point. This is performed by CPU instructions 208–210.

With the synchronization point available, instructions 211 ask for the number of cylinder pairs (P=m). Instructions 212 locate the first minimum count (valley) following the synch point (216, FIG. 4(c) and instructions 213 identify the first cylinder pair (i.e 29, FIG. 4(a)). As illustrated in FIG. 4, illustration (c) this defines the beginning of the compression stroke (32) of cylinder 3L.

Following either instructions 206, 213 the CPU scans the referenced waveform data points to determine the maximum and minimum speed $\Delta$ values for the complete engine cycle. Instructions 222 request the determination of the speed $\Delta$ values for the left and right bank cylinders of the cylinder pair next following the synchronization point, which is cylinder pair 29 (FIG. 4). This results in a $\Delta_1$ speed change (count increase) coinciding with the compression stroke 32 of cylinder 3L and a $\Delta_3$ speed change coinciding with the expansion stroke 36 of cylinder 2R of the pair. Instructions 224 request a determination of whether or not a $\Delta$ value is missing in the cylinder pair. This is defined as the absence of a speed change $\Delta$ within a specified angular interval of crank shaft rotation ($\Delta\theta$) from a preceding $\Delta$ value, or as provided in the processor by a maximum number of TOOTH* intervals. Such that, in FIG. 4, illustration (c) if it is assumed that the compression of cylinder 2R is so low so that there is no discernable magnitude change in speed ($\Delta_3^1$) then instructions 226 require the $\Delta$ value for that cylinder be set at zero. If there is a detectable speed $\Delta$ within the permitted crankshaft interval ($\Delta\theta$) the value is recorded as required by instructions 228. Following instructions 228 instructions 229 ask whether or not this is the last cylinder pair, (P=m), and if not the CPU increments the address counter by one in instructions 230; selects next cylinder pair in instructions 231 and branches back to instructions 222 to find the speed $\Delta$ values associated with the next cylinder pair.

Figure 5D:
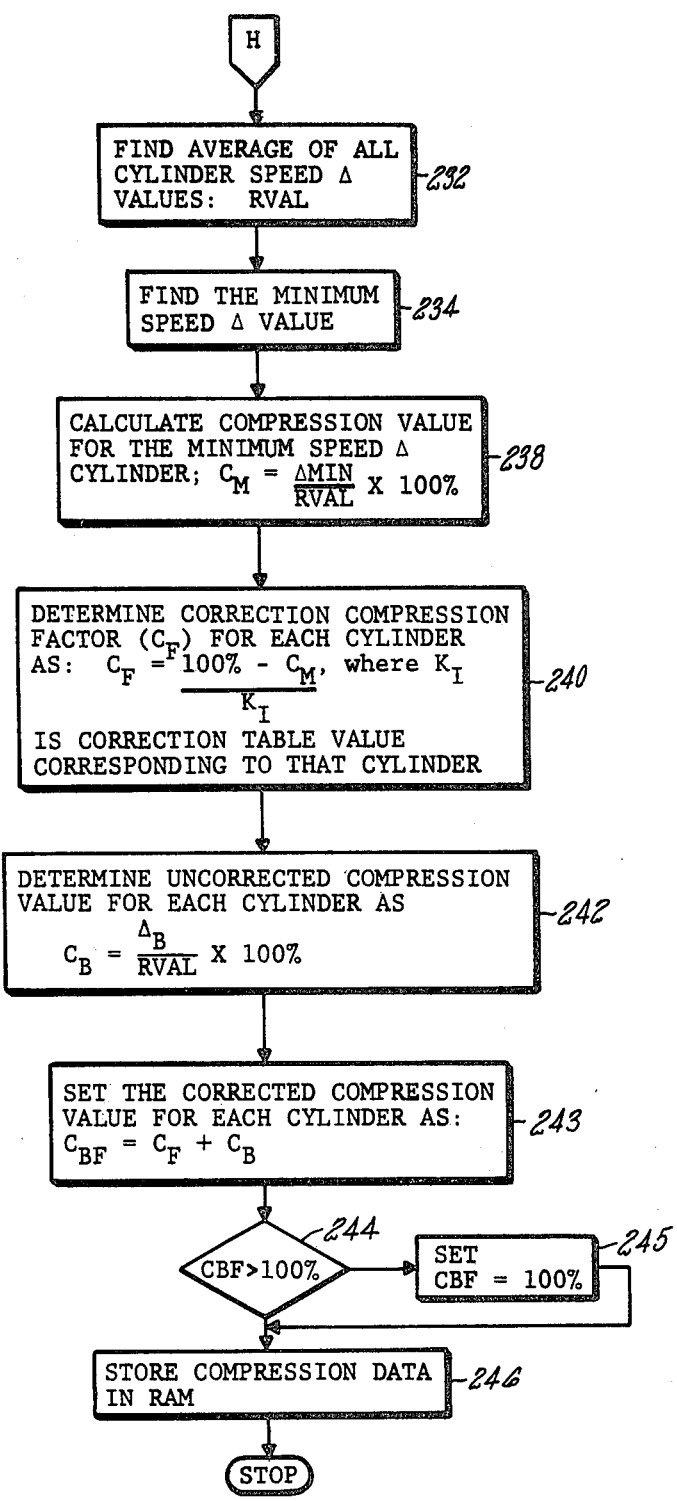

In FIG. 5D, following the recording of the detected speed $\Delta$ for each cylinder, or the assigned zero value for the cylinders having a nondetectable speed $\Delta$, instructions 232 request the determination of the average value (RVAL) of the set of speed $\Delta$ values actually detected. Instructions 234 request the determination of the minimum ($\Delta$ min) value of the set. Since the existence of a low compression cylinder causes a transferred effect on the measured engin speed $\Delta$ of succeeding good cylinders, as shown in FIG. 4 illustration (c) where the assumed low compression cylinder 2R affects the speed change associated with succeeding cylinders as shown by the dashed waveform 236. This transferred speed effect on the remaining good cylinders may be determined empirically for a given engine type such that a correction value may be determined for each cylinder depending on its relative location in the firing order from the low compression cylinder. The correction factor magnitude decreases for succeedingly further spaced cylinders. As such the identified low compression cylinder is used to index a table of correction values stored in the ROM 54. There are two sets of correction values, one for use if the minimum speed $\Delta$ is obtained from a left bank cylinder and the other if the minimum $\Delta$ is obtained from a right bank cylinder. A generalized table listing the correction factor ($K_I$) for a six cylinder engine is illustrated in FIG. 6. Although the correction table is set up to provide a correction factor for each of the six cylinders, the cylinder having the minimum speed $\Delta$ which is used to index the table is itself not corrected.

The CPU provides the correction of the measured $\Delta$ for each cylinder other than that providing the minimum $\Delta$ in a subroutine beginning with instructions 238 which request the compression value for the minimum speed $\Delta$ cylinder ($C_{M\%}$) as the ratio of the measured minimum $\Delta$ to the average RVAL determined in instructions 232. Instructions 240 next request the correction factor to be used for each remaining cylinder based on the compression value obtained for the minimum $\Delta$ cylinder in instructions 238, as:

$$C_F = (100\% - C_M)/K_I$$

where $K_I$ is the value obtained from the correction table in ROM. Instructions 242 through 246 next determine first the uncorrected compression value ($C_B$) for each remaining cylinder as the ratio of the actual measured change in speed divided by RVAL, and the corrected compression value ($C_{BF}$) for each cylinder as the sum of the actual $C_B$ plus the particular cylinder $C_F$ correction factor. Since the final compression value for each cylinder depends upon the ratio of the actual speed delta to the average delta value the percent compression is limited to 100%. Readout of the relative compression values for each cylinder is provided by the CPU through the RS232C port to the line printer 50 and, if sufficient display is available, to the hand held controller 48.

The measurement of relative compression according to the present invention provides for an accurate measurement of compression in any type of asymmetric IC engine. The assumption of the adiabatic characteristics of the cylinders during cranking without ignition is accurate and allows for accurate measurement of the relative compression of each cylinder. The invention may be used on any type of IC engine. Similarly, although the invention has been shown and described with respect to a best mode embodiment, thereof, it should be understood by those skilled in the art that the foregoing and various other changes, omissions and additions in the form and detail thereof may be made therein without departing from the spirit and scope of this invention.

We claim:

1. A method of measuring the relative compression of the cylinders of an asymmetric firing internal combustion engine of the type having cylinders grouped in one or more pairs where the cylinders in each pair are spaced from each other by a first crankshaft angle and each pair is spaced from adjacent pairs by a second crankshaft angle value greater than the first, the steps of:

cranking the engine without ignition,
detecting the occurrence in each engine cycle of an engine event occurring in each cycle at a defined crankshaft angle,
measuring the angular rotation of an engine member mounted to and rotating with the engine crankshaft to provide a signal manifestation of the angular speed of the crankshaft and recording the successively sampled signal manifestations of crankshaft speed versus successive equal intervals of crankshaft angle referenced to the crankshaft index signal in each cycle to provide information of the change in crankshaft speed as a function of crankshaft angular displacement from said index point;

measuring the rate of change of the signal manifestation of crankshaft speed versus crankshaft angle provided by each cylinder and recording a speed change value associated with each cylinder;

determining the maximum speed change signal from among the plurality of cylinders; and comparing the recorded values of speed change for each cylinder with the maximum speed change to provide as a ratio of the speed change for each cylinder divided by the maximum speed change an indication of relative compression for each cylinder.

2. The method of claim 1 wherein the step of measuring the change in engine speed versus crankshaft angle comprises:

determining the change in engine speed from a minimum to a maximum occurring during the compression stroke of the left hand cylinder in each pair as a manifestation of said left hand cylinder compression; and determining the change in engine speed from a maximum to a minimum corresponding to the power stroke of the right hand cylinder of said pair to provide a signal manifestation of the compression of said right hand cylinder of each pair.

3. The method of claim 2 wherein each of said types of determining the change in engine speed further includes the step of:

assigning, in the absence of a change in crankshaft speed within a range of crankshaft angles associated with a cylinder, a value of zero as the signal manifestation of the compression value for that cylinder.

4. The method of claim 1 wherein the step of measuring the change in crankshaft speed versus crankshaft angle associated with each cylinder, includes the steps of:

counting the passage of each tooth of the engine flywheel past a selected point as the crankshaft rotates and comparing the count value to the total tooth count associated with the flywheel for the engine under test, the interval between successive counts defining successive equal increments of crankshaft angle;

successively sampling the signal manifestation of crankshaft speed at intervals associated with said intervals between successive tooth counts and comparing a succeeding sample speed signal with a preceding sample speed signal to determine a change in speed associated with said interval between tooth counts; P1 recording the change in speed values with the associated count interval to provide an indication of the minimum speed and maximum speed associated with each cylinder as a function of crankshaft angle (calculate change in speed over a predetermined number of tooth count intervals and assign a zero compression value if no maximum speed value is detected within the predetermined number of tooth counts).

5. Apparatus for measuring the relative compression in an asymmetric internal combustion engine wherein the cylinders are grouped in cylinder pairs within the firing order, while the engine is cranking, comprising:

means for measuring the angular rotation of an engine member mounted to and rotating with the engine crankshaft to provide a signal manifestation of the engine cranking speed within successive, substantially equal crankshaft angle increments:

data acquisition means for successively sampling the engine cranking speed manifestation from said measuring means in each of said successive crankshaft angle intervals, and for registering said signal manifestations to provide an engine cranking speed signal for each interval;

signal processing means, responsive to said data acquisition means for receiving said engine cranking speed signals in each of said successive crankshaft angle intervals over one or more complete engine cycles, said processing means identifying each engine cranking signal speed sampled by the associated crankshaft angle interval for providing a speed change signal in each of said crank shaft angle intervals, said processing means providing an indication of the compression of each cylinder as the total change in engine speed associated with the compression stroke of the first cylinder in each cylinder pair and the total change in engine cranking speed associated with the expansion stroke of the second cylinder in each cylinder pair.

6. The apparatus of claim 5 wherein said processing means provides an indication of relative compression for each cylinder as the ratio of the measured change in engine cranking speed associated with the cylinder to the average value of the engine cranking speed changes of all cylinders.

7. The apparatus of claim 5 further comprising:

means for detecting the occurrence in each engine cycle of a engine event occurring once in each cycle at a defined crankshaft angle, said means providing a crankshaft signal index in response to each of said events; and wherein said processing means is responsive to said crankshaft index signal for providing said relative compression indications together with the identification of the particular engine cylinder providing said compression indication, said processing means identifying each cylinder in dependence on the displacement of the cylinder in crankshaft angular degrees from the crankshaft angle value defined by said crankshaft index signal.

* * * * *

UNITED STATES PATENT AND TRADEMARK OFFICE
CERTIFICATE OF CORRECTION

PATENT NO. : 4,348,893
DATED : September 14, 1982
INVENTOR(S) : Tony D. Hendrix and Rinaldo R. Tedeschi It is certified that error appears in the above-identified patent and that said Letters Patent is hereby corrected as shown below:

Column 4, line 63 "on" should be --of--.

Column 6, line 30 "beings" should be -- begins--.

Column 8, line 54 "paris" should be --pairs--.

Column 8, line 67 "cylider" should be --cylinder--.

Column 9, line 55 "engin" should be --engine--.

Signed and Sealed this

Seventh Day of December 1982

[SEAL]

Attest:

Attesting Officer

GERALD J. MOSSINGHOFF

Commissioner of Patents and Trademarks